United States Patent
Park et al.

(10) Patent No.: US 7,450,521 B2
(45) Date of Patent: Nov. 11, 2008

(54) COST-BASED ROUTING USING BACKOFF SCHEME

(75) Inventors: Jong-hun Park, Suwon-si (KR); Myung-jong Lee, New York, NY (US); Yong Liu, New York, NY (US); Xuhui Hu, New York, NY (US)

(73) Assignees: Samsung Electronics Co., Ltd., Suwon (KR); City University of New York, New York, NY (US)

(*) Notice: Subject to any disclaimer, the term of this patent is extended or adjusted under 35 U.S.C. 154(b) by 722 days.

(21) Appl. No.: 11/055,016

(22) Filed: Feb. 11, 2005

(65) Prior Publication Data

US 2005/0185588 A1 Aug. 25, 2005

Related U.S. Application Data

(60) Provisional application No. 60/543,293, filed on Feb. 11, 2004.

(30) Foreign Application Priority Data

Jan. 11, 2005 (KR) .................. 10-2005-0002579

(51) Int. Cl.
- *G01R 31/08* (2006.01)
- *G06F 11/00* (2006.01)
- *G08C 15/00* (2006.01)
- *H04J 1/16* (2006.01)
- *H04J 3/14* (2006.01)
- *H04L 1/00* (2006.01)
- *H04L 12/26* (2006.01)
- *H04L 12/28* (2006.01)

(52) U.S. Cl. .................. 370/252; 370/238; 370/351

(58) Field of Classification Search .......... 370/238, 370/282, 351, 252, 253, 448, 238.1, 235, 370/232, 230.1, 312, 390; 709/241

See application file for complete search history.

(56) References Cited

U.S. PATENT DOCUMENTS 5,854,899 A * 12/1998 Callon et al. .......... 709/238

(Continued)

FOREIGN PATENT DOCUMENTS

WO 03-105356 A1 12/2003

OTHER PUBLICATIONS

Douglas S. J. De Couto, Daniel Aguayo, John Bicket and Robert Morris: "A high-throughput path metric for multi-hop wireless routing" MOBICOM 03, Proceeding of the 9th Annual International Conference on Mobile Computing and Networking, Online! Sep. 14, 2003, pp. 134-146.

*Primary Examiner*—Edan Orgad
*Assistant Examiner*—Hoang-Chuong Q Vu
(74) *Attorney, Agent, or Firm*—Sughrue Mion, PLLC

(57) ABSTRACT

A routing method comprising receiving a first packet, the first packet being broadcast for discovery of a route. A first backoff of the first packet is calculated based on a route cost of the first packet. The first packet is rebroadcast if a second packet is not received within the first backoff, the second packet being a duplicate of the first packet. A second backoff of the second packet is calculated based on a route cost of the second packet if the second packet is received within the first backoff. One of the first and the second packets is rebroadcast as a result of comparing the first backoff and the second backoff.

12 Claims, 5 Drawing Sheets

U.S. PATENT DOCUMENTS

| | | | |
|---|---|---|---|
| 5,987,011 A | 11/1999 | Toh et al. | 370/331 |
| 6,034,946 A * | 3/2000 | Roginsky et al. | 370/238 |
| 6,088,333 A * | 7/2000 | Yang et al. | 370/238 |
| 6,594,272 B1 * | 7/2003 | Ketcham et al. | 370/428 |
| 6,615,221 B2 * | 9/2003 | Warner et al. | 707/104.1 |
| 6,697,335 B1 * | 2/2004 | Ergun et al. | 370/238 |
| 6,778,502 B2 * | 8/2004 | Ricciulli | 370/238 |
| 6,894,985 B2 * | 5/2005 | Billhartz | 370/252 |
| 6,954,435 B2 * | 10/2005 | Billhartz et al. | 370/252 |
| 7,007,102 B2 * | 2/2006 | Billhartz et al. | 709/238 |
| 7,035,207 B2 * | 4/2006 | Winter et al. | 370/225 |
| 7,058,021 B2 * | 6/2006 | Srikrishna et al. | 370/252 |
| 7,177,295 B1 * | 2/2007 | Sholander et al. | 370/338 |
| 7,272,116 B1 * | 9/2007 | Houchen | 370/258 |
| 7,280,483 B2 * | 10/2007 | Joshi | 370/238 |
| 2001/0012300 A1 * | 8/2001 | Raisanen | 370/429 |
| 2002/0049561 A1 * | 4/2002 | Garcia-Luna-Aceves et al. | 702/182 |
| 2002/0186665 A1 * | 12/2002 | Chaffee et al. | 370/255 |
| 2003/0039212 A1 * | 2/2003 | Lloyd et al. | 370/235 |
| 2003/0163554 A1 * | 8/2003 | Sendrowicz | 709/220 |
| 2003/0202468 A1 * | 10/2003 | Cain et al. | 370/229 |
| 2003/0204616 A1 | 10/2003 | Billhartz et al. | 709/235 |
| 2003/0219014 A1 * | 11/2003 | Kotabe et al. | 370/375 |
| 2004/0153520 A1 * | 8/2004 | Rune et al. | 709/206 |
| 2004/0165532 A1 * | 8/2004 | Poor et al. | 370/238 |
| 2004/0260808 A1 * | 12/2004 | Strutt | 709/224 |
| 2004/0260831 A1 * | 12/2004 | Dyck et al. | 709/233 |
| 2005/0036486 A1 * | 2/2005 | Sahinoglu et al. | 370/389 |
| 2005/0105470 A1 * | 5/2005 | Lazzeri et al. | 370/237 |
| 2005/0286419 A1 * | 12/2005 | Joshi et al. | 370/230 |
| 2006/0114919 A1 * | 6/2006 | Bontempi | 370/408 |
| 2006/0178150 A1 * | 8/2006 | Kim | 455/445 |
| 2006/0182034 A1 * | 8/2006 | Klinker et al. | 370/238 |
| 2007/0280192 A1 * | 12/2007 | Yagyu et al. | 370/349 |

* cited by examiner

COST-BASED ROUTING USING BACKOFF SCHEME

CROSS-REFERENCED TO RELATED APPLICATIONS

This application claims the benefits of U.S. Provisional Application No. 60/543,293, filed on Feb. 11, 2004, and Korean Patent Application No. 2005-2579, filed on Jan. 11, 2005, in the Korean Intellectual Property Office, the disclosures of which are incorporated herein in their entirety.

BACKGROUND

1. Field

The disclosed teachings relate to routing, and more particularly, to a technique for routing which is capable of discovering an optimal route by use of a backoff scheme. A backoff for the backoff scheme is calculated based on a route cost such as link quality.

2. Description of the Related Art

An on-demand routing such as Ad hoc On Demand Distance Vector (AODV) routing is to discover a route effectively in an Ad hoc type wireless network. In AODV routing, when a source node wishes to send data to a destination node but contains no effective routing information, the source node floods the whole network with a Route REQest (RREQ) packet to discover possible routes leading to the destination node. In order to limit route discovery traffic, each intermediate node only rebroadcasts the first received RREQ packet and discards duplicated RREQ packets arriving subsequent to the first RREQ packet. Such an AODV routing is more suitable to a hop-count-based routing and guarantees the discovery of the shortest route.

However, the first received RREQ packet is not necessarily essential in discovering the optimal route in view of route cost. That is, in wireless networks, the hop-count is not the dominant route cost criterion any longer. Instead, link quality, energy efficiency, and security become the key factors to determine the route cost. In other words, the AODV routing is unsuitable to a cost-based routing which prefers the optimal route to the shortest route. This is because if the intermediate node only relays the first RREQ packet, the best route is very likely ignored.

FIG. 1 illustrates a network by way of an example, in which S denotes a source node and D denotes a destination node. Node F receives a first RREQ packet through route S-B-F, which is the shortest route between the node S and the node F. However, since the node B is located at transmission borders 10 and 20 of both the nodes S and F, link qualities in the routes S-B and B-F are very poor. Although the route S-C-E-F guarantees higher link quality, the RREQ packets transmitted through this route are discarded by the node F as the duplicated RREQ packets. Accordingly, the node S does not know the existence of the route S-C-E-F-G-D which is the optimal route in view of link qualities.

If all of the intermediate nodes are allowed to relay the duplicated RREQ packets, the probability that the optimal route is discovered increases. However, if most intermediate nodes have to rebroadcast the same RREQ packets for multiple times, control overhead inevitably increases. Accordingly, since all of the intermediate nodes relay the duplicated packets, the precious resources of wireless devices are depleted and normal data traffic is interfered with.

SUMMARY

The disclosed teachings are aimed at solving some of the above-discussed problems in the related art. Accordingly, an aspect of the disclosed teachings is to provide a cost-based routing which ensures the discovery of optimal route with small control overhead The above aspect is achieved by providing a routing method comprising receiving a first packet which is broadcasted for discovery of a route, calculating a first backoff of the first packet based on a route cost of the first packet, rebroadcasting the first packet if a second packet which is a duplicate of the first packet is not received within the first backoff, and if the second packet is received within the first backoff, calculating a second backoff of the second packet based on a route cost of the second packet, and rebroadcasting one of the first and the second packets as a result of comparing the first backoff and the second backoff.

The route cost may be calculated based on at least one of a link quality, an energy efficiency, and a security. The first and the second packets may be RREQ (Route Request) packets.

In the step of rebroadcasting one of the first and the second packets, if the second backoff is less than the first backoff, the second packet is rebroadcast after a pre-set time, and if the second backoff is greater than or equal to the first backoff, the first packet is rebroadcast after the first backoff. If a third backoff which is calculated by adding the second backoff to an arrival time of the first packet is greater than or equal to a current time, the pre-set time is the third backoff, and if the third backoff is less than the current time, the pre-set time is the most recent rebroadcastable time. The pre-set time is a time that is calculated by adding the second backoff to an arrival time of the second packet.

The routing method may further comprise, if the second packet is received after the first packet is rebroadcast, discarding the second packet. The routing method may further comprise receiving the second packet after the first packet is rebroadcast, if the second backoff is less than the first backoff, rebroadcasting the second packet and updating the first backoff to the second backoff, and if the second backoff time is greater than or equal to the first backoff, discarding the second packet.

Another aspect of the disclosed teachings is a computer network comprising a plurality of nodes including a source node, an intermediate node, a destination node and further comprising a timing calculator, a first packet and a second packet. The intermediate node is operable to receive the first packet, the first packet being broadcast by the network from the source node for discovering a route to the destination node. The timing calculator is operable to calculate a first backoff of the first packet based on a route cost of the first packet. The intermediate node is operable to rebroadcast the first packet if the second packet is not received within the first backoff, the second packet being a duplicate of the first packet. The timing calculator is further operable to calculate a second backoff of the second packet based on a route cost of the second packet if the second packet is received within the first backoff. The intermediate node is further operable to rebroadcast one of the first and the second packets as a result of comparing the first backoff and the second backoff.

BRIEF DESCRIPTION OF THE DRAWINGS

The above aspect and other advantages of the disclosed teachings will be more apparent by describing an embodiment in greater detail with reference to the accompanying drawings, in which.

DESCRIPTION OF AN EXEMPLARY EMBODIMENT

Herein below, the disclosed teachings will now be described in greater detail with reference to the accompanying drawings.

A routing according to the disclosed teachings does not aim to rebroadcast only a first RREQ packet which is received at an intermediate node, but aims to rebroadcast one of the first RREQ packet and a duplicated RREQ packet arriving subsequent to the first RREQ packet that is transmitted through an optimal route in view of route cost.

Figure 1:
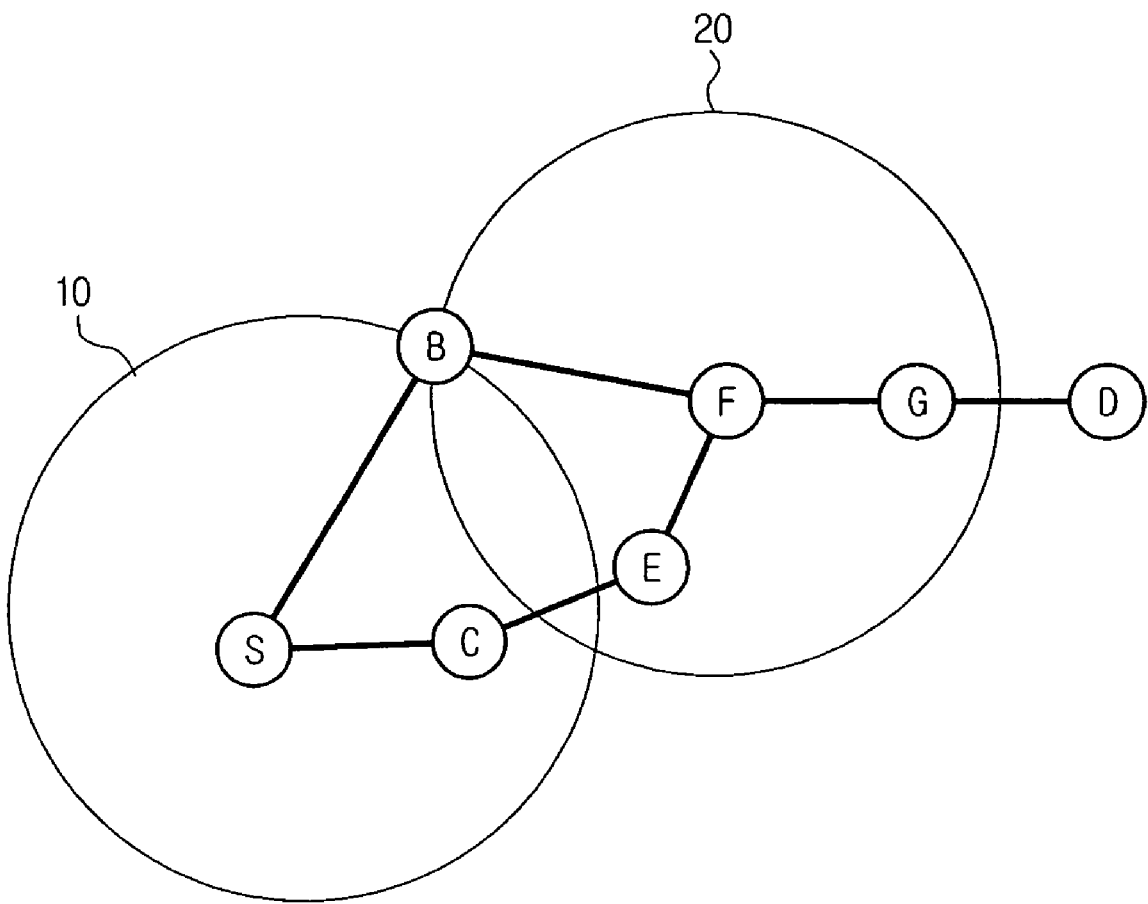
FIG. 1 is a view showing a network to explain a conventional routing.
Figure 2A:
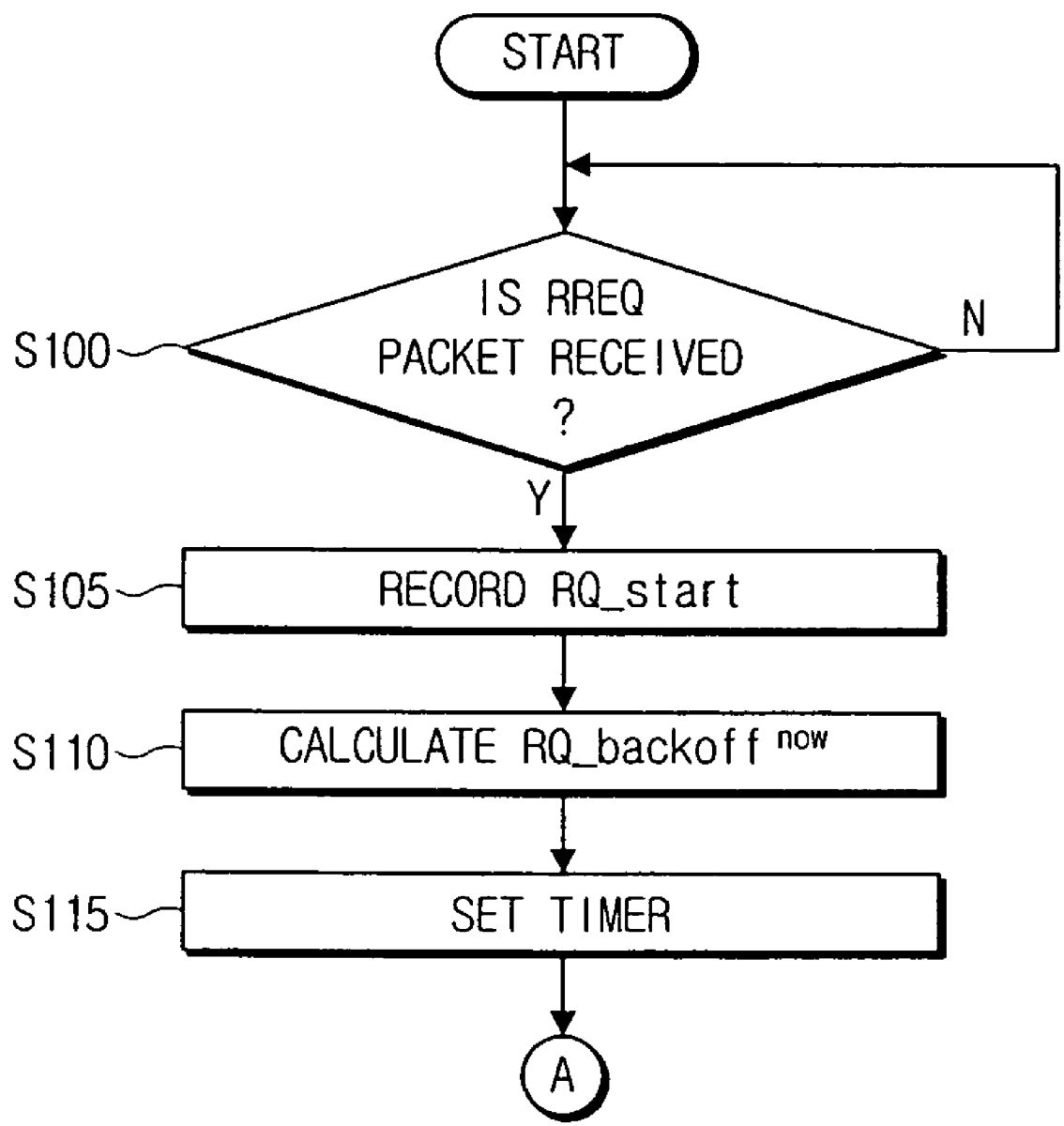
FIGS. 2A and 2B are flowcharts illustrating a routing according to an embodiment of the disclosed teachings.
Figure 2B:
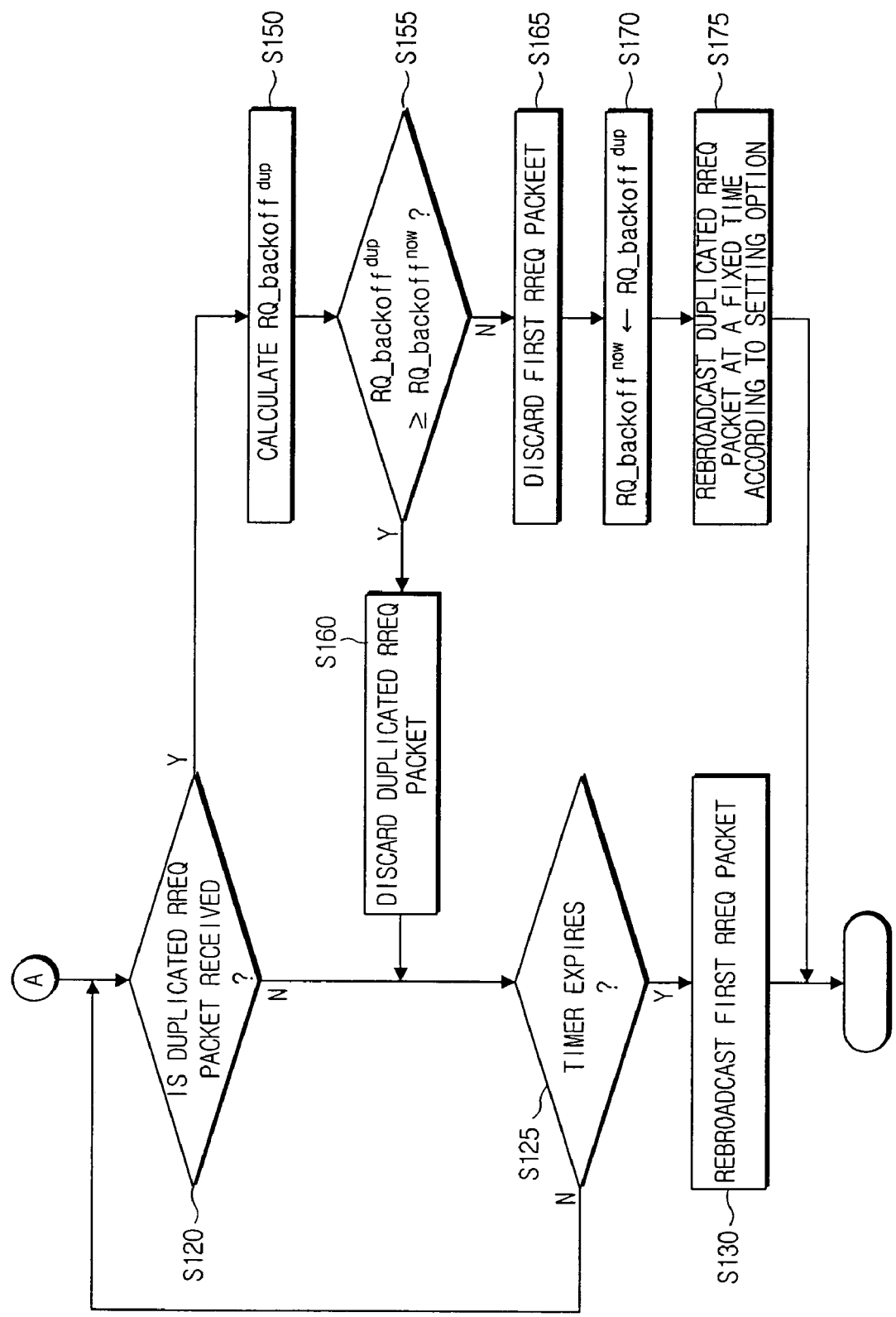

FIGS. 2A and 2B are flowcharts illustrating a routing procedure according to an embodiment of the disclosed teachings. Referring to FIG. 2A, when a certain intermediate node linked to a network receives a first RREQ packet (S100), it records an arrival time RQ_start of the first RREQ packet (S105). After then, a $RQ\_backoff^{now}$ is calculated (S110). The RQ_backoff denotes a backoff that is established by the intermediate node based on a route cost incurred from a source node to the intermediate node, such as link quality, energy efficiency, and security. The RQ_backoff increases as the route cost increases. The $RQ\_backoff^{now}$ denotes a backoff of the first RREQ packet. If the $RQ\_backoff^{now}$ is calculated, a timer is set within intermediate node to expire after $RQ\_start+RQ\_backoff^{now}$ (S115). The timing calculations are performed using a timing calculator.

Referring to FIG. 2B, if the node does not receive any second packet, which is a duplicated packet having the same data as the first packet, during a timer period (S120 and S125), the node rebroadcasts the first RREQ packet after $RQ\_start+RQ\_backoff^{now}$ at which the timer expires (S130).

Figure 3:
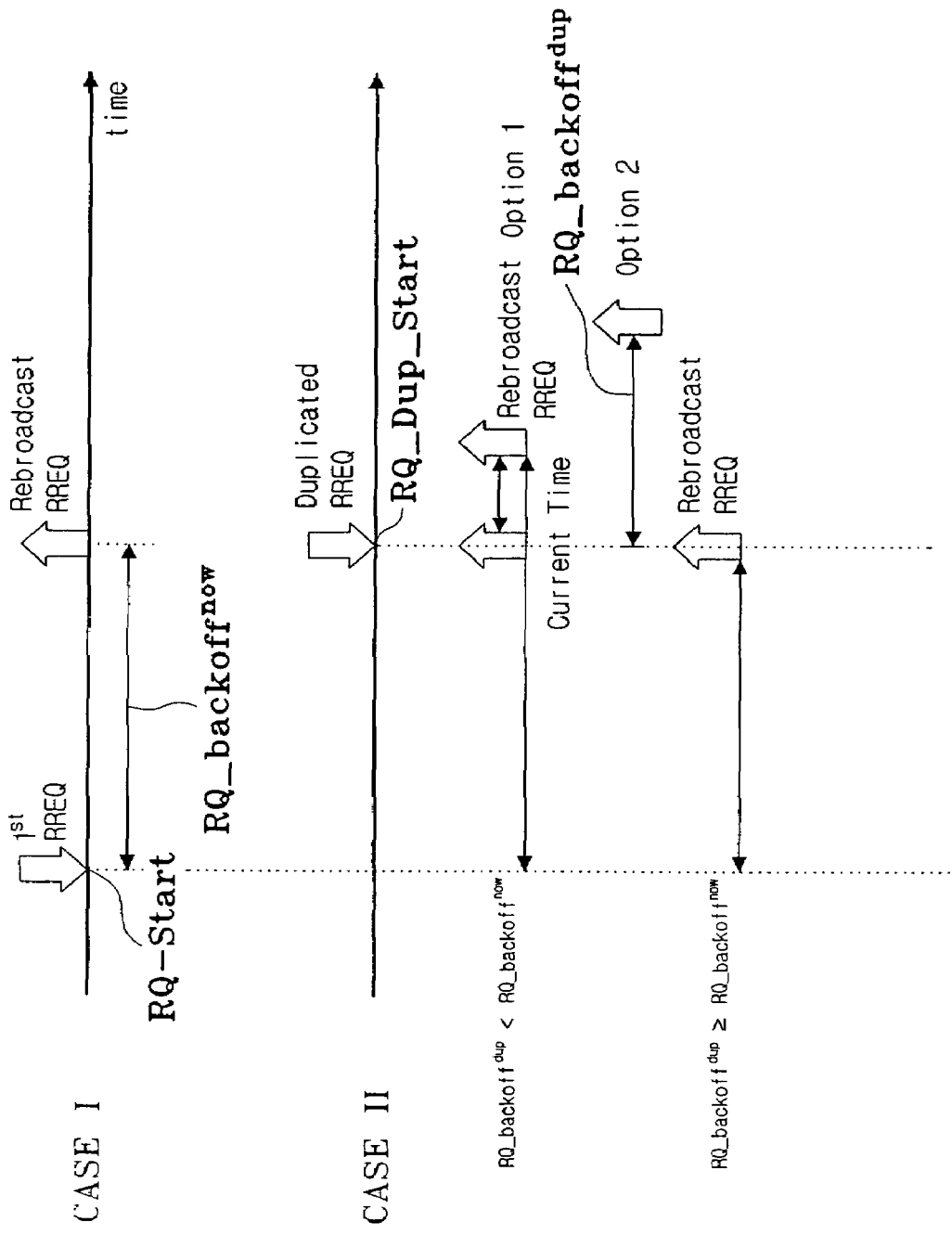
FIGS. 3 and 4 are views to explain the routing according to the described embodiment.

'CASE I' of FIG. 3A illustrates the above-described case using a time axis. The arrow '$1^{st}$ RREQ' indicates an arrival time of the first RREQ packet, and the arrow 'Rebroadcast RREQ' indicates the time when the first RREQ packet is rebroadcast. If any duplicated RREQ packet is not received until the $RQ\_start+RQ\_backoff^{now}$, the first RREQ packet is rebroadcast.

If the duplicated RREQ packet is received subsequent to the first RREQ packet during a period of the $RQ\_start+RQ\_backoff^{now}$, a $RQ\_backoff^{dup}$ is calculated (S150). The $RQ\_backoff^{dup}$ denotes a backoff of the duplicated RREQ packet that is calculated based on the route cost.

The calculated $RQ\_backoff^{dup}$ is compared with the $RQ\_backoff^{now}$. As a result of the comparison, if $RQ\_backoff^{dup} \geq RQ\_backoff^{now}$, the duplicated RREQ packet is discarded (S155 and S160), and the first RREQ packet is rebroadcast when the initially set timer expires (steps S125 and S130).

Meanwhile, if the $RQ\_backoff^{dup} < RQ\_backoff^{now}$, the first RREQ packet is discarded (S165), and the $RQ\_backoff^{now}$ is updated to the $RQ\_backoff^{dup}$ (S170). The duplicated RREQ packet is rebroadcast at the time that is determined according to a pre-established setting option. The setting option is established by one of the following two methods.

According to the first method, the $RQ\_start+RQ\_backoff^{dup}$ is compared with a current time. If the $RQ\_start+RQ\_backoff^{>}$ the current time, the timer is re-set to the $RQ\_start+RQ\_backoff_{dup}$, and the duplicated RREQ packet is rebroadcast when the re-set timer expires. Otherwise, the duplicated RREQ packet is promptly rebroadcast.

According to the second method, the timer is re-set to $RQ\_DUP\_start+RQ\_backoff^{dup}$, and when the re-set timer expires, the duplicate RREQ packet is rebroadcast. The RQ_DUP_start denotes an arrival time of the duplicated RREQ packet.

'CASE II' of FIG. 3A illustrates the above-described case using a time axis. The arrow 'Duplicated RREQ' indicates an arrival time of the duplicated RREQ packet, and the above-described first method is 'Option 1' and the second method is 'Option 2'.

Meanwhile, if the duplicated packet is received after the first RREQ packet is rebroadcast, it is processed through one of the following two procedures.

The first is to simply discard the duplicated RREQ packet.

According to the second procedure, the calculated $RQ\_backoff^{dup}$ is compared with the $RQ\_backoff^{now}$. If the $RQ\_backoff^{dup} < RQ\_backoff^{now}$, which means the duplicated RREQ packet has a lower route cost than that of the first RREQ packet, the duplicated RREQ packet is promptly rebroadcast, and the $RQ\_backoff^{now}$ is updated to the $RQ\_backoff^{dup}$. On the other hand, if $RQ\_backoff^{dup} \geq RQ\_backoff^{now}$, which means the duplicate RREQ packet has a higher rout cost than that of the first RREQ packet, the duplicated RREQ packet is discarded.

Figure 4:
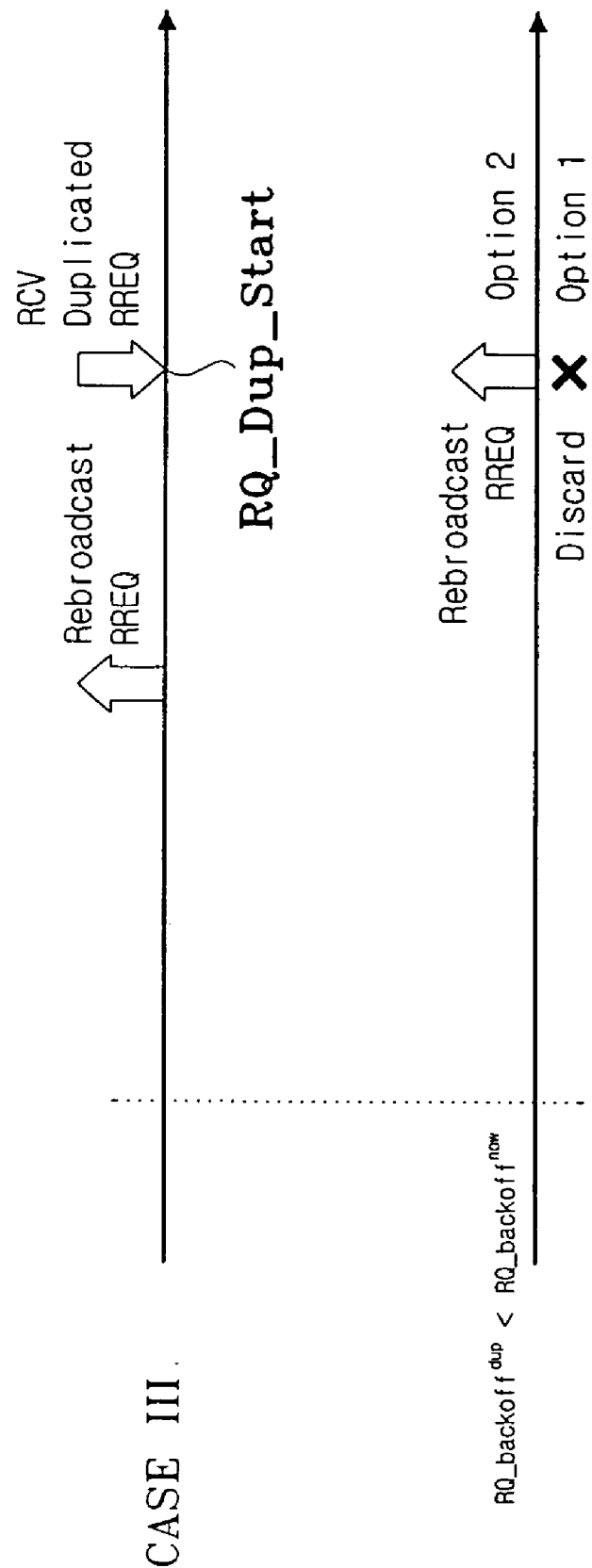

'CASE III' of FIG. 4 illustrates the above-described case, in which 'Option 1' denotes a case where the duplicated RREQ packet is discarded, and 'Option 2' denotes a case where the duplicated RREQ packet is promptly rebroadcast if the $RQ\_backoff^{dup} < RQ\_backoff^{now}$.

Since the routing according to the present invention does not rebroadcast only the first RREQ packet and rebroadcast the RREQ packet that is transmitted through an optimal route in view of the route cost, it ensure the discovery of the optimal route based on the route cost.

Also, since each intermediate node rebroadcast the RREQ packet within the established backoff, it can prevent transmission collisions of the RREQ packets and thus, control overhead can be reduced.

Although the preferred embodiments have been disclosed for illustrative purposes, those skilled in the art will appreciate that various modifications and changes are possible, without departing from the scope and spirit of the invention as disclosed in the accompanying claims and such modifications and changes fall in the scope of the present invention defined in the claims.

What is claimed is:

1. A routing method comprising:

receiving a first packet, the first packet being broadcast for discovery of a route;

calculating a first backoff of the first packet based on a route cost of the first packet;

rebroadcasting the first packet if a second packet is not received within the first backoff, the second packet being a duplicate of the first packet; and if the second packet is received within the first backoff, calculating a second backoff of the second packet based on a route cost of the second packet, and rebroadcasting one of the first and the second packets as a result of comparing the first backoff and the second backoff, wherein, during rebroadcasting one of the first and the second packets, if the second backoff is less than the first backoff, the second packet is rebroadcast after a pre-set time, and if the second backoff is greater than or equal to the first backoff, the first packet is rebroadcast after the first backoff, and wherein, if a third backoff which is calculated by adding the second backoff to an arrival time of the first packet is greater than or equal to a current time, the pre-set time is the third backoff, and if the third backoff is less than the current time, the pre-set time is a most recent rebroadcastable time.

2. The routing method as claimed in claim 1, wherein the route cost is calculated based on at least one of a link quality, an energy efficiency, and a security.

3. The routing method as claimed in claim 1, wherein the first and the second packets are RREQ (Route Request) packets.

4. The routing method as claimed in claim 1, wherein the pre-set time is a time that is calculated by adding the second backoff to an arrival time of the second packet.

5. The routing method as claimed in claim 1, further comprising:

if the second packet is received after the first packet is rebroadcast, discarding the second packet.

6. The routing method as claimed in claim 1, further comprising:

receiving the second packet after the first packet is rebroadcast;

if the second backoff is less than the first backoff, rebroadcasting the second packet and updating the first backoff to the second backoff; and if the second backoff is greater than or equal to the first backoff, discarding the second packet.

7. A computer network comprising:

a plurality of nodes including source node, an intermediate node, a destination node;

the network further comprising a timing calculator, a first packet and a second packet;

the intermediate node being operable to receive the first packet, the first packet being broadcast by the network from the source node for discovering a route to the destination node;

the timing calculator being operable to calculate a first backoff of the first packet based on a route cost of the first packet;

the intermediate node being operable to rebroadcast the first packet if the second packet is not received within the first backoff, the second packet being a duplicate of the first packet, the timing calculator being further operable to calculate a second backoff of the second packet based on a route cost of the second packet if the second packet is received within the first backoff, and the intermediate node being further operable to rebroadcast one of the first and the second packets as a result of comparing the first backoff and the second backoff, wherein the intermediate node is operable to rebroadcast the second packet if the second backoff is less than the first backoff, and the intermediate node is operable to rebroadcast the first packet if the second backoff is greater than or equal to the first backoff, and wherein the timing calculator is operable to calculate a third backoff by adding the second backoff to an arrival time of the first packet, the network is operable to set a pre-set time to be the third backoff if the third backoff is greater than or equal to a current time, and the network is operable to set the pre-set time to be a most recent broadcastable time if the third backoff is less than the current time.

8. The computer network as claimed in claim 7, wherein the route cost is calculated based on at least one of a link quality, an energy efficiency, and a security.

9. The computer network as claimed in claim 7, wherein the first and the second packets are RREQ (Route Request) packets.

10. The computer network as claimed in claim 7, wherein the pre-set time is a time that is calculated by adding the second backoff to an arrival time of the second packet.

11. The computer network as claimed in claim 7 wherein the intermediate node is operable to discard the second packet if the second packet is received after the first packet is rebroadcast.

12. The computer network as claimed in claim 7, wherein, the intermediate node is operable to receive the second packet after the first packet is rebroadcast;

the intermediate node is operable to rebroadcast the second packet and update the first backoff to the second backoff if the second backoff is less than the first backoff; and the intermediate node is operable to discard the second packet if the second backoff is greater than or equal to the first backoff.

* * * * *